US012786343B2

(12) United States Patent
Kumar Agrawal et al.

(10) Patent No.: US 12,786,343 B2
(45) Date of Patent: Nov. 3, 2026

(54) CONFERENCING SYSTEM TERMINAL DEVICES AND CORRESPONDING METHODS FOR PRESENTING VIDEO OVERLAYS DURING LOCAL SIDE CONFERENCES OCCURRING DURING VIDEOCONFERENCES

(71) Applicant: Motorola Mobility LLC, Chicago, IL (US)

(72) Inventors: Amit Kumar Agrawal, Bangalore (IN); Krishnan Raghavan, Bangalore (IN); Vignesh Karthik Mohan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 449 days.

(21) Appl. No.: 18/230,529

(22) Filed: Aug. 4, 2023

(65) Prior Publication Data

US 2025/0047803 A1 Feb. 6, 2025

(51) Int. Cl.

*H04N 5/272* (2006.01)
*G06F 3/16* (2006.01)
*G06T 7/70* (2017.01)
*G06V 40/10* (2022.01)
*H04L 65/403* (2022.01)

(52) U.S. Cl.

CPC ............. *H04N 5/272* (2013.01); *G06F 3/165* (2013.01); *G06T 7/70* (2017.01); *G06V 40/10* (2022.01); *G06T 2207/10016* (2013.01); *G06T 2207/30201* (2013.01); *H04L 65/403* (2013.01)

(58) Field of Classification Search

None

See application file for complete search history.

(56) References Cited

U.S. PATENT DOCUMENTS 8,717,408 B2 * 5/2014 Khot ...................... H04N 7/152 379/202.01
10,270,915 B2 4/2019 Schmitz
(Continued)

FOREIGN PATENT DOCUMENTS

KR 101569863 11/2015

OTHER PUBLICATIONS

"Proactive Partitioning of sessions in unified telephony applications", Mar. 2, 2011; IPCOM000204541D.
(Continued)

*Primary Examiner* — Phung-Hoang J Nguyen
(74) *Attorney, Agent, or Firm* — Philip H. Burrus, IV

(57) ABSTRACT

A method in a conferencing system terminal device includes detecting, with one or more processors during a videoconference, a communication device electronically in communication with a plurality of remote electronic devices engaged in the videoconference. The method includes also detecting, with one or more sensors during the videoconference, an authorized user of the conferencing system terminal device engaging in a side conversation. One or more processors cause the communication device to transmit a video overlay for the authorized user of the conferencing system terminal device to the plurality of remote electronic devices while the side conversation occurs. This conceals the authorized user's participation in the side conversation.

20 Claims, 8 Drawing Sheets

(56) References Cited

U.S. PATENT DOCUMENTS

| | | | | |
|---|---|---|---|---|
| 10,424,297 | B1 | 9/2019 | Carino | |
| 2005/0015444 | A1 | 1/2005 | Rambo | |
| 2008/0136895 | A1* | 6/2008 | Mareachen | H04N 7/147 348/14.03 |
| 2011/0066422 | A1* | 3/2011 | Hybschmann | G06F 40/58 348/E7.086 |
| 2012/0017149 | A1* | 1/2012 | Lai | H04L 65/403 715/758 |
| 2013/0198657 | A1* | 8/2013 | Jones | H04L 12/1827 715/753 |
| 2014/0171047 | A1 | 6/2014 | Mai | |
| 2016/0352911 | A1 | 12/2016 | Scmitz | |
| 2018/0323972 | A1* | 11/2018 | Reed | H04W 12/068 |
| 2020/0005539 | A1* | 1/2020 | Hwang | G06F 3/167 |
| 2020/0296144 | A1 | 9/2020 | Smit | |
| 2022/0014712 | A1* | 1/2022 | Cordourier Maruri | H04L 12/1827 |
| 2022/0020388 | A1 | 1/2022 | Trim | |
| 2022/0122583 | A1 | 4/2022 | Bates | |
| 2022/0288452 | A1* | 9/2022 | Sims | G06F 18/41 |
| 2022/0321832 | A1 | 10/2022 | Lin | |
| 2023/0276115 | A1* | 8/2023 | Agrawal | H04N 23/695 348/333.03 |
| 2024/0202636 | A1 | 6/2024 | Daga | |

OTHER PUBLICATIONS

Barker, Todd, "Final Office Action", U.S. Appl. No. 18/230,526, filed Aug. 4, 2023; Mailed Oct. 18, 2024.

Barker, Todd, "NonFinal Office Action", U.S. Appl. No. 18/230,526, filed Aug. 4, 2023; Mailed Feb. 20, 2024.

Esbensen, et al., "SideBar: Video Conferencing System Supporting Social Engagement", IEEE International Conference on Collaborative Computing: Networking, Applications and Worksharing, Oct. 22, 2014; IEEE Publishing.

Henderson, et al., "IPCOM0000246968D: Enhanced Virtual I Sidebar", Jul. 19, 2016; IP.co.

Knapp, et al., "Increasing Interaction in a Flipped Online Classroom through Video Conferencing", Published Oct. 5, 2018; Springer Link.

Qiu, et al., "Avoiding the Evolved Node B Buffer Overflow by Using Advertisement Window Control", The 11th International Symposium on Communications & Information Technologies, Oct. 12, 2011, IEEE Publishing.

Shohfi, Thomas, "Implications of Buy Side Analyst Earnings Conference Call Participation", Oct. 2014; U.S. Securities and Exchange Commission Financial Management Association Annual Meeting.

Singh, et al., "VclickLEndpoint Driven Enterprise WebRTC", IEEE International Symposium on Multimedia; Dec. 1, 2015.

* cited by examiner

- PRIOR ART

CONFERENCING SYSTEM TERMINAL DEVICES AND CORRESPONDING METHODS FOR PRESENTING VIDEO OVERLAYS DURING LOCAL SIDE CONFERENCES OCCURRING DURING VIDEOCONFERENCES

BACKGROUND

Technical Field

This disclosure relates generally to electronic devices, and more particularly to electronic devices capable of providing video conferencing features.

Background Art

Many modern electronic devices, including smartphones, tablet computers, and laptop computers, are equipped to engage in videoconferences with other electronic devices across a network. Users employ such devices to communicate with friends, family, and work colleagues. This is especially true during times of pandemic, when people work remotely rather than going to a centralized office. Participants engage videoconferencing to engage in real-time discussions and share electronic content. Videoconferencing additionally offers participants the ability to see other participants via video feeds streamed to the participating electronic devices. It would be advantageous to have an improved methods, systems, and devices to make videoconferences more efficient by eliminating distractions that may occur while videoconferences are occurring.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
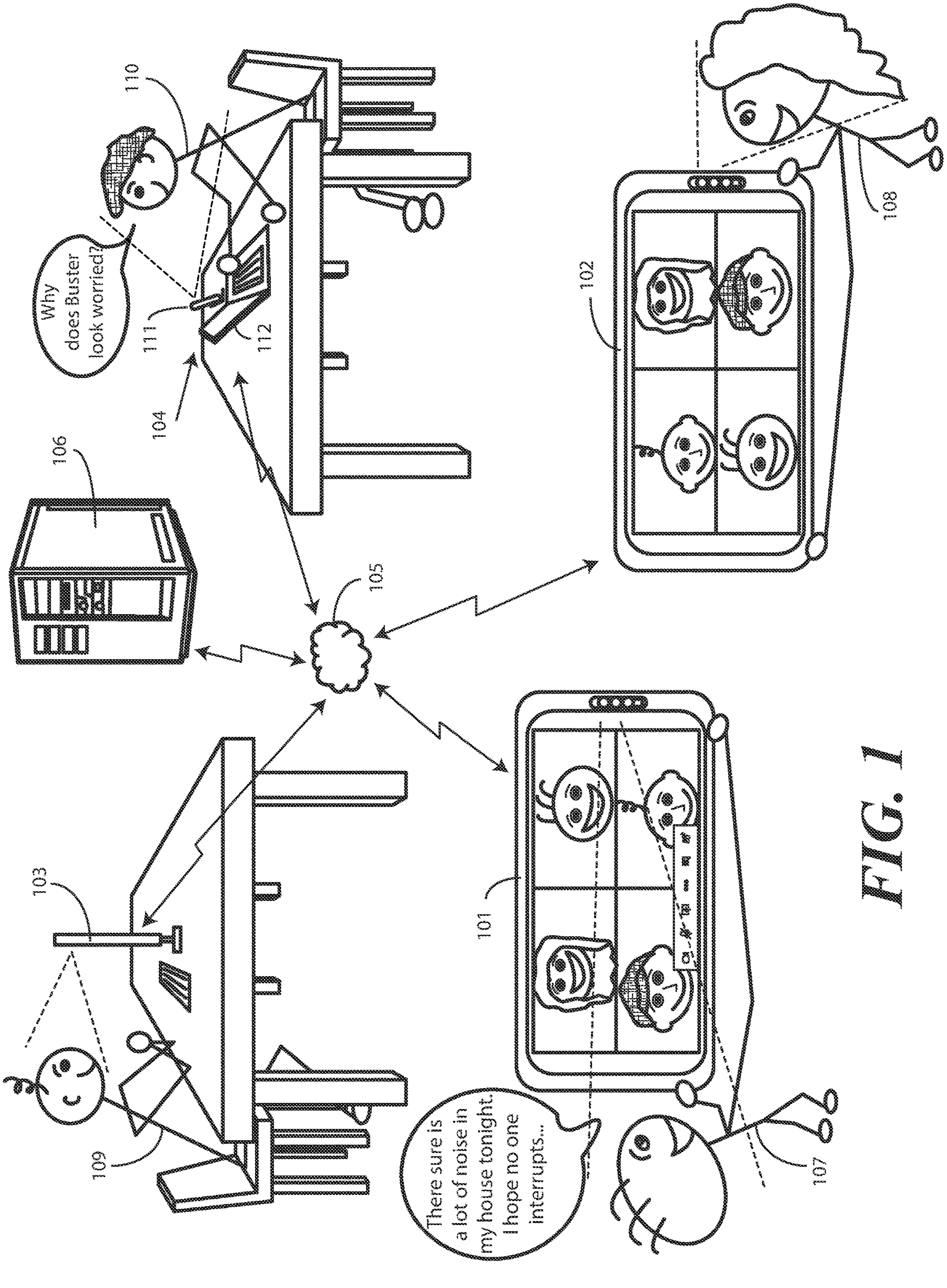
FIG. 1 illustrates one explanatory conferencing system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting, with one or more sensors of a conferencing system terminal device during a videoconference, a user of the conferencing system terminal device engaging in a side conversation or side activity and causing, in response to detection of the side conversation, one or more processors to transmit a video overlay for the user of the conferencing system terminal device to other remote electronic devices engaged in the videoconference concealing the participant's engagement in the side conversation or side activity. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of determining that an authorized user of a conferencing system terminal device is engaged in a conversation or other activity outside the videoconference while the videoconference is occurring and, in response, causing a communication device of the conferencing system terminal device to transmit a video overlay to one or more remote electronic device concealing participation of the authorized user in the conversation or other activity occurring outside the videoconference as described herein. The non-processor circuits may include, but are not limited to, a radio receiver, a radio transmitter, signal drivers, clock circuits, power source circuits, and user input devices.

As such, these functions may be interpreted as steps of a method to perform detecting, with one or more sensors of a conferencing system terminal device while the conferencing system terminal device is engaged in the videoconference with one or more remote electronic devices, authorized user authorized user of the conferencing system terminal device is engaged in a side conversation and concealing, by one or more processors of the conferencing system terminal device, participation of the authorized user in the side conversation by replacing a video feed of the au being delivered to the one or more remote electronic devices with a video overlay. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically.

As used herein, "side activity," "side conference," and similar side operations refer to conversations, activities, and other actions taken by the user of a conferencing system terminal device within a local environment of the conferencing system terminal device during a videoconference where the user ceases interaction with the videoconference and/or application portal facilitating the videoconference on the conferencing system terminal device. Illustrating by example, when a participant of a videoconference turns away from the conferencing system terminal device to speak to a person sitting next to the participant or to a family member, this would constitute a side conversation because the participant has turned their attention away from the conferencing system terminal device and away from the application portal presented on the conferencing system terminal device facilitating the videoconference to instead talk to a person in the local environment of the conferencing system terminal device or family member instead. Similarly, if the participant turns away from the application portal facilitating the videoconference to speak to a child or pet, this also constitutes a side conversation because the participant's attention is no longer directed toward the videoconference and is instead directed to a person or animal unrelated to the videoconference. Side conversations and side activities can be detected in a variety of ways, examples of which include looking away from both the conferencing system terminal device and the application portal facilitating the videoconference, detection of a sudden change in tone or pitch, detection of a different language being spoken, and so forth. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods and systems for concealing side conversations and side activities that a person may engage in locally while also participating in a videoconference. Embodiments of the disclosure contemplate that in many formal and informal videoconference settings, a participant may need to turn their attention away from the videoconference to talk to a friend in the room, a family member in the room, a pet, a child, or other person or animal not engaged with the videoconference. Embodiments of the disclosure contemplate that the participant may not want this side conversation to be part of the videoconference. Moreover, embodiments of the disclosure contemplate that such side conversations may be distracting for others engaged in the videoconference.

Advantageously, embodiments of the disclosure provide a solution to such situations that allows side conversations and side activities to be concealed to the participants of a videoconference not engaged in such side conversations or side activities. In one or more embodiments, a method in a conferencing system terminal device comprises detecting, with one or more processors during a videoconference, a communication device electronically in communication with a plurality of remote electronic devices engaged in the videoconference. In one or more embodiments, the method also comprises detecting, with one or more sensors of the conferencing system terminal device during the videoconference, an authorized user of the conferencing system terminal device engaging in a side conversation or side activity.

In one or more embodiments, when the one or more sensors detect the side conversation or side activity, the one or more processors cause the communication device to transmit a video overlay for the authorized user of the conferencing system terminal device to the plurality of remote electronic devices while the side conversation or side activity occurs. Advantageously, this video overlay conceals the side conversation or side activity by precluding depictions of the person's face from being transmitted to the other remote electronic devices engaged in the videoconference.

In one or more embodiments, a conferencing system terminal device comprises a communication device that communicates with one or more remote electronic devices during a videoconference. In one or more embodiments, the conferencing system terminal device also includes one or more sensors and one or more processors operable with the communication device and the one or more sensors.

In one or more embodiments, the one or more processors determine, from signals from the one or more sensors, that an authorized user of the conferencing system terminal device is engaged in a conversation or activity outside the videoconference. In one or more embodiments, when this occurs the one or more processors cause the communication device to transmit a video overlay to one or more remote electronic device engaged in the videoconference that conceals participation of the authorized user in the activity or conversation occurring outside the videoconference. Thus, if the wife of a participant of a videoconference enters the room during the videoconference and asks the participant what he did with her car keys, when the participant turns away to answer the one or more processors, from the signals from the one or more sensors, would detect a side conversation occurring and transmit a video overlay to the other remote electronic devices engaged in the videoconference to conceal this side conversation.

In one or more embodiments, a method in a conferencing system terminal device comprises detecting, with one or more sensors while the conferencing system terminal device is engaged in a videoconference with one or more remote electronic devices, an authorized user of the conferencing system terminal device engaging in a side conversation. In one or more embodiments, the one or more processors then conceal participation of the authorized user in the side conversation by replacing a video feed of the authorized user being delivered to the one or more remote electronic devices with a video overlay. In one or more embodiments, this replacement continues until the side conversation terminates, in which transmission of the video overlay is terminated and transmission of the video feed depicting the participant resumes.

Turning now to FIG. 1, illustrated therein is one explanatory videoconference system in accordance with one or more embodiments of the disclosure. As shown, multiple participants 107,108,109,110 each employ their own respective conferencing system terminal device 101,102,103,104 to engage with the other participants via the videoconference. In this illustrative embodiment, conferencing system terminal devices 101,102 are shown as smartphones, while conferencing system terminal device 103 is a desktop computer. Conferencing system terminal device 104 is a hybrid system where participant 110 watches the other participants 107, 108, 109 on a laptop computer 112 but uses the superior camera of his smartphone 111 to capture images of his face.

However, conferencing system terminal devices suitable for use in the videoconference system can take other forms as well. For instance, tablet computers, notebook computers, audiovisual devices, mobile phones, smart watches, or other devices can be used by participants to engage in the videoconference as well. Other examples of conferencing system terminal devices will be obvious to those of ordinary skill in the art having the benefit of this disclosure.

As shown in FIG. 1, each conferencing system terminal device 101,102, 103, 104 is engaged in wired or wireless communication with each other across a network 105, one example of which is the Internet via the World Wide Web. It should be noted that the network 105 could be a public, private, local area, wide area, or other type of network across which wired or wireless electronic communications can be exchanged.

In this illustrative embodiment, each conferencing system terminal device 101,102,103,104 is also in communication with a video conferencing system server complex 106 across the network 105. As will be described in more detail with reference to FIG. 7 below, in one or more embodiments video conferencing system server complex 106 includes components such as a web server, a database server, an audio server, and optionally a video server (the video server may be omitted for audio only conferencing systems) that are operable to facilitate videoconferences between the various conferencing system terminal devices 101,102, 103,104 of the videoconference system.

These components of the video conferencing system server complex 106 can be combined on the same server. Alternatively, these components can be distributed on any number of servers to increase load handling capacity beyond that of a single server, and so forth. Other configurations for the video conferencing system server complex 106 will be obvious to those of ordinary skill in the art having the benefit of this disclosure.

In one or more embodiments, the video conferencing system server complex 106 performs functions such as maintaining a schedule of videoconferences, maintaining lists of participants, as well as allowing each participant's conferencing system terminal device to engage with the videoconference, and so forth. In one or more embodiments, the video conferencing system server complex 106 also facilitates the transmission of audio and video content during the occurrence of the videoconference.

In one or more embodiments, the video conferencing system server complex 106 functions as an intermediary device to facilitate sharing of audio and/or video content and/or data between the various conferencing system terminal devices 101,102, 103,104. For example, as can be seen on the displays of conferencing system terminal devices 101,102, in this example each participant 107,108,109,110 can see each other participant engaged in the videoconference.

In the illustrative example of FIG. 1, the participants 107,108,109, 110 are engaged in the videoconference. Since the participants 107,108,109,110 are all engaged in a videoconference, each can see conference content in the form of a combined video feed from each other participant 107,108,109, 110 presented on the display of each conferencing system terminal device 101,102,103,104, as well as a video feed of themselves. Each participant 107,108, 109, 110 can hear an audio feed from each other participant 107,108,109,110 as well.

In this illustrative example, Buster, who is participant 107, notices that there is a lot of noise in his house during this videoconference. Buster has been working from home since the pandemic, and this videoconference is very important as there are many business colleagues in attendance that Buster sincerely wants to impress. Noticing all the noise, Buster really hopes he will neither be interrupted or embarrassed by someone coming into the room where Buster is accessing the videoconference to do something silly. Participant 110, Mac, knows Buster well and can tell he is nervous.

Figure 2:
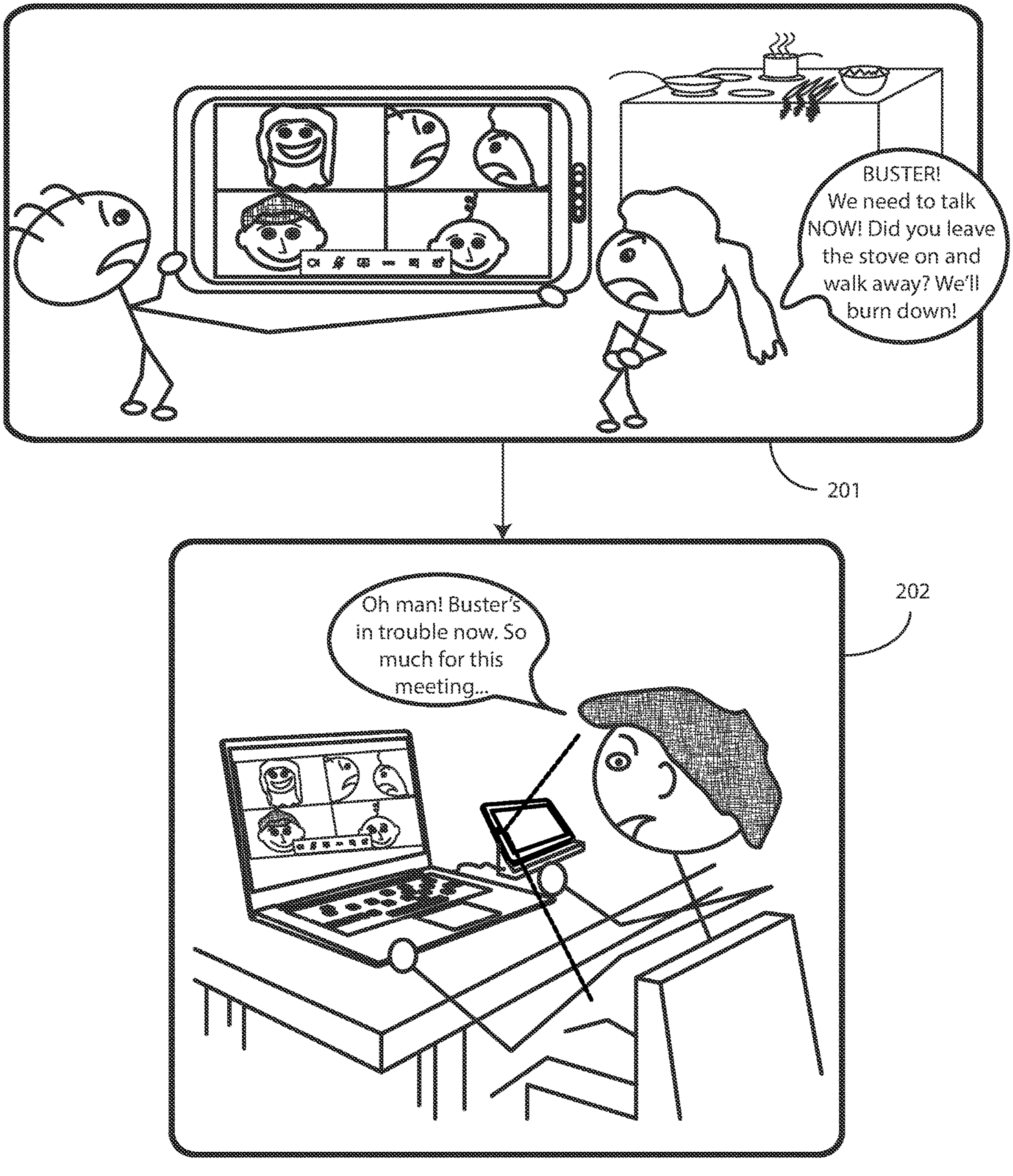
FIG. 2 illustrates a prior art videoconferencing system operating when a distraction occurs during a videoconference.

Turning now to FIG. 2, illustrated therein are one or more method steps that show why Buster would be nervous when using a prior art system that his fears may be realized. As shown at step 201, Buster's wife, Kayla, is furious. When trying to log into the application portal facilitating the videoconference on time, Buster inadvertently left dinner cooking on the stove. After warning him many, many times about "turning the burners on high and walking away," he has done it once again. Accordingly, she lets Buster have it and have it good. She starts yelling about Buster setting the house on fire, burning them all down, how irresponsible he is, how he does not listen, how dinner is now ruined, and how long it will take to start dinner again.

Unfortunately, Buster is using a prior art conferencing system terminal device. This means that Kayla is within the field of view of the image capture device carried by the prior art conferencing system terminal device. She is also within range of the microphone carried by the conferencing system terminal device. Consequently all her anger is captured in the video feed and audio feed depicting Buster. As shown at step 202, everyone on the videoconference can see and hear Buster getting dressed down. Mac, concerned about Buster, thinks the meeting is basically ruined because this is such a terrible distraction witnessed by all. It will be impossible to redirect everyone's focus to the business at hand. He artfully quotes John Prine by saying, "Hey Mr. Brown, turn the volume down, I believe this evening's shot."

Advantageously, embodiments of the disclosure provide a solution to this problem. In one or more embodiments, a method in a conferencing system terminal device comprises detecting, with one or more processors during a videoconference, a communication device electronically in communication with a plurality of remote electronic devices engaged in the videoconference. The method also includes detecting, with one or more sensors during the videoconference, an authorized user of the conferencing system terminal device engaging in a side conversation. When this occurs, one or more processors of the conferencing system terminal device transmit a video overlay for the authorized user of the conferencing system terminal device to the plurality of remote electronic devices while the side conversation occurs.

Advantageously, by concealing the side conversation from the other participants of the videoconference, the embarrassment and humiliation that Buster feels in the situation shown in FIG. 2 can be avoided. Additionally, private or confidential information shared during the side conversation will not be shared with the other participants of the videoconference. Other advantages offered by embodiments of the disclosure will be described below. Still other will be obvious to those of ordinary skill in the art having the benefit of this disclosure.

Applying these steps to the illustrative example of FIG. 1, one or more processors of Buster's conferencing system terminal device 101 can detect, during the videoconference, a communication device of the conferencing system terminal device 101 electronically in communication with a plurality of remote electronic devices engaged in the videoconference, which in this example are conferencing system terminal devices 102,103,104. One or more sensors of conferencing system terminal device 101 can detect Buster engaging in a side conversation with Kayla. One or more processors of the conferencing system terminal device 101 can then conceal this side conversation by causing a communication device of conferencing system terminal device 101 to transmit a video overlay of Buster to the conferencing system terminal devices 102,103,104 engaged in the videoconference instead of transmitting a video feed depicting the side conversation. If Buster were engaged in a side activity, such as petting his dog, concealment could occur in the same way in response to the side activity being detected.

While the video overlay is being, other optional operations, each of which can be used alone or in combination, can occur. Illustrating by example, in one or more embodiments when the side conversation or side activity is detected, an output volume of the videoconference from an audio output of conferencing system terminal device 101 will be reduced. In one or more embodiments, the one or more processors of conferencing system terminal device 101 can preclude the communication device from transmitting audio signals associated with the side conversation or side activity to the remote electronic devices engaged in the videoconference. Thus, if Buster were getting yelled at by Kayla as shown in FIG. 2, none of the other videoconference participants would hear the dressing down because participants 108,109,110 would not receive audio signals from the side conversation. In one or more embodiments, the one or more processors of conferencing system terminal device 101 simply mute the microphone when a side conversation or side activity is occurring.

When the side conversation or side activity terminates, the settings of the mainstream videoconference can be restored for the conferencing system terminal device 101. In one or more embodiments, this comprises restoring the volume of the main videoconference to its original level at the conferencing system terminal device 101. In one or more embodiments, the microphone of the conferencing system terminal device 101 are unmuted again.

Figure 3:
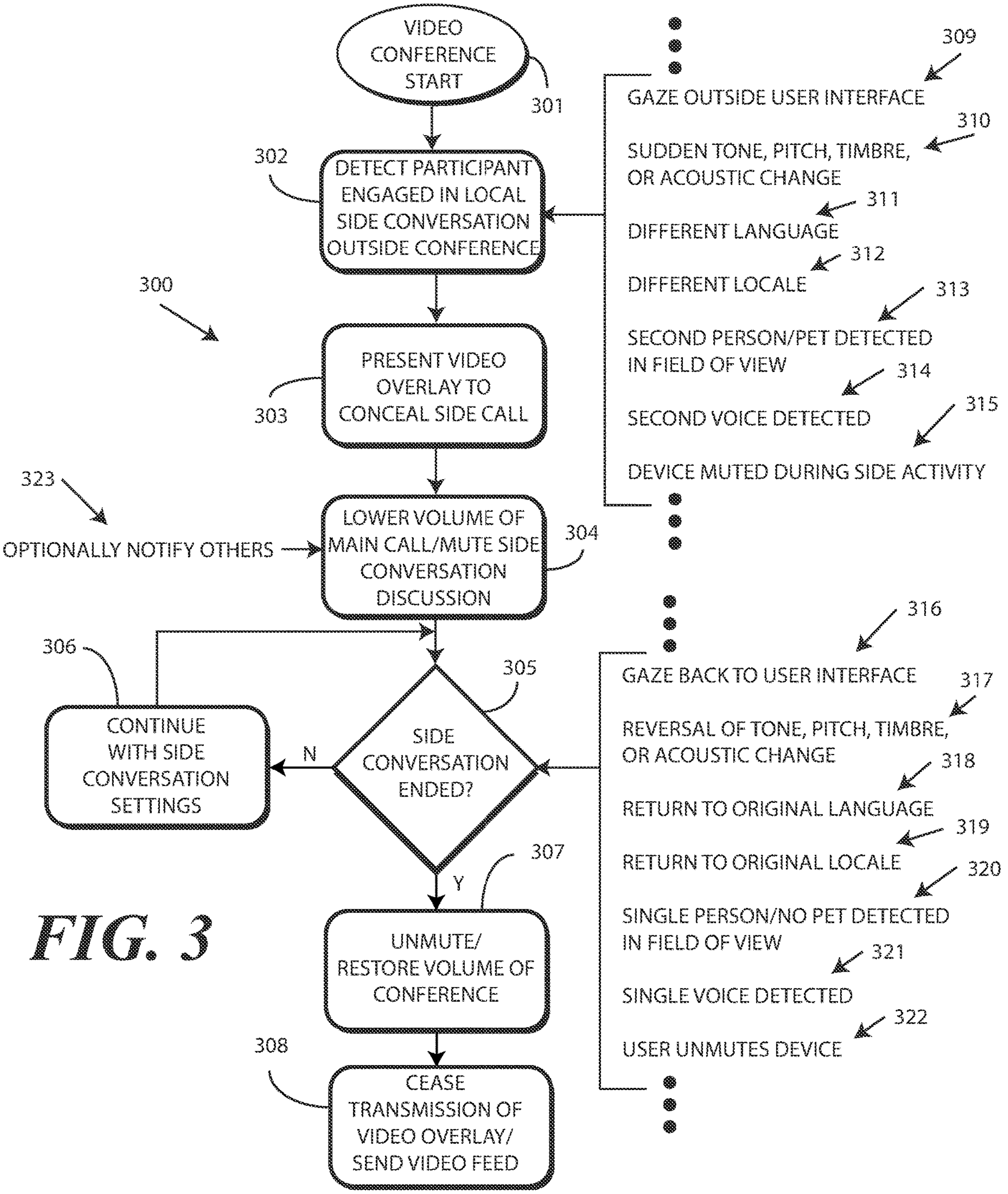
FIG. 3 illustrates one explanatory method in accordance with one or more embodiments of the disclosure.

Turning now to FIG. 3, illustrated therein is one explanatory method 300 configured in accordance with one or more embodiments of the disclosure. Beginning at stage 301, a videoconference is initiated.

During the videoconference initiated at stage 301, a plurality of conferencing system terminal devices each employ a communication device to communicate with the other conferencing system terminal devices, which constitute remote electronic devices during the videoconference. In one or more embodiments, each conferencing system terminal device engaged in the videoconference thus has a communication device in communication with a plurality of remote electronic devices during the videoconference. In one or more embodiments, each conferencing system terminal device also includes a user interface and one or more processors operable with the communication device and the user interface.

At step 302, the one or more processors of a conferencing system terminal device detect an authorized user of a conferencing system terminal device engaging in a side conversation or side activity. In one or more embodiments, the side conversation or side activity detected at step 302 occurs within a physical environment of the conferencing system terminal device. Detection of the side conversation or side activity can be done in a variety of ways.

In one or more embodiments, the detecting the authorized user engaging in the side conversation at step 302 comprises detecting a gaze 309 of the authorized user being directed away from the conferencing system terminal device. If, for example, a person engaged in a videoconference turns away from his conferencing system terminal device to talk to the person sitting next to the participant in the physical environment of the conferencing system terminal device, their gaze will be directed at the person and not the conferencing system terminal device. Accordingly, step 302 can detect such a side conversation by detecting the gaze 309 of the authorized user being directed away from the conferencing system terminal device in one or more embodiments.

In other embodiments, the detecting the authorized user engaging in the side conversation at step 302 comprises detecting a sudden change 310 in audio characteristics of the person's speech, examples of which include pitch, timber, tone, and volume. If, for example, someone asked a participant engaged in a videoconference something from another room, the participant may have to raise their voice to answer. Such as change in volume can allow one or more sensors of a conferencing system terminal device to detect a side conversation at step 302 in one or more embodiments. Similarly, if a participant spills hot coffee on themself during a videoconference, they may scream suddenly in pain. This sudden change in tone and pitch can enable one or more sensors of a conferencing system terminal device to detect a side activity at step 302 in one or more embodiments.

Thus, in one or more embodiments the detecting the authorized user engaging in the side conversation or side activity at step 302 comprises detecting a change in pitch of a voice of the authorized user of the conferencing system terminal device. In other embodiments, the detecting the authorized user engaging in the side conversation or side activity at step 302 comprises detecting a change in tone of a voice of the authorized user of the conferencing system terminal device.

In still other embodiments, the detecting the authorized user engaging in the side conversation at step 302 comprises detecting a participant in a videoconference suddenly speaking in a different language 311 or in a different location 312. Embodiments of the disclosure contemplate that when sharing private, personal, confidential, or non-public information some people will speak in a different language. For instance, if Buster is engaged in the videoconference of FIG. 1 and all the other participants (108, 109, 110) speak English, Buster might say "stop-you're completely embarrassing me" to Kayla in Spanish so that the other participants (108, 109, 110) do not understand what he is saying. Accordingly, this can allow one or more sensors of the conferencing system terminal device to detect a side conversation at step 302 in one or more embodiments. Location can be used in a similar manner.

Thus, in one or more embodiments the detecting the authorized user engaging in the side conversation or side activity at step 302 comprises detecting an authorized user of a conferencing system terminal device speaking in a different language than during the videoconference. In other embodiments, the detecting the authorized user engaging in the side conversation or side activity at step 302 comprises detecting the authorized user changing a location during the videoconference.

In still other embodiments, when a second person or an animal enters the field of view 313 of the image capture device carried by a conferencing system terminal device, this can allow one or more sensors of the conferencing system terminal device to detect a side conversation or side activity. Said differently, in one or more embodiments the detecting the authorized user engaging in the side conversation or side activity at step 302 comprises detecting one or more of a second person and/or a pet entering a field of view of an image capture device capturing images used in the videoconference.

In the example of FIG. 2 above, when Kayla entered the field of view of the image capture device, there was clearly a side conversation occurring. Accordingly, the appearance of another person, or animal as would be the case when a pet entered the field of view 313 of a conferencing system terminal device can allow the one or more sensors to detect a side conversation or side activity in one or more embodiments.

The appearance of a second voice 314 in audio signals captured by a microphone of the conferencing system terminal device can be used to detect side conversations or side activities in a similar manner. Thus, in one or more embodiments the detecting the authorized user engaging in the side conversation or side activity at step 302 comprises detecting a voice of the authorized user and another voice with an audio input device of the conferencing system terminal device/

The status of the microphone of the conferencing system terminal device can be used in conjunction with other signals from the one or more sensors to detect a side activity or side conversation as well. In one or more embodiments, when a participant has a microphone muted 315 with the image capture device on and is trying to communicate outside of the videoconference one or more sensors can detect this at step 302 to determine that a side conversation is occurring. These examples of detecting a side conversation or side activity are illustrative only, as numerous others will be obvious to those of ordinary skill in the art having the benefit of this disclosure.

At step 303, in response to detecting a side conversation or side activity occurring at step 302, in one or more embodiments to one or more processors of the conferencing system terminal device cause the communication device to transmit a video overlay for the authorized user of the conferencing system terminal device to the plurality of remote electronic devices engaged in the videoconference for as long as the side conversation or side activity occurs. In one or more embodiments, the transmission of this video overlay conceals, to the other participants of the videoconference, that the side conversation or side activity is occurring.

In one or more embodiments, the video overlay comprises a smart loop of a few seconds of video depicting the user engaged in the videoconference to preclude other participants engaged in the videoconference from knowing that a particular participant is engaged in a side conversation or side activity. The transmission of the video overlay prevents other participants from reading the side conversation or side activity participant's lips in an effort to guess what the side conversation or side activity is about. In one or more embodiments, the video overlay is transmitted when the microphone of the conferencing system terminal device of the participant in the side conversation or side activity is muted, and the participant is engaged in the side conversation or side activity. Thus, when a person is talking to someone sitting next to him or to his family or is turning his head away to talk to a child or a pet or so forth, step 303 comprises transmitting a video overlay for that person to the plurality of remote electronic devices while the side conversation occurs. In one or more embodiments the video overlay conceals participation of the person in the side activity or side conversation.

In one or more embodiments, the video overlay transmitted at step 303 comprises a loop of the participant looking into the eyes of the image capture device of their conferencing system terminal device. In other embodiments, the video overlay transmitted at step 303 comprises computer-generated imagery (CGI), an animation, previously recorded video or images of the participant, or other compensating content overlays to conceal their participation in the side conversation or side activity.

In one or more embodiments, the delivery of the video overlay transmitted at step 303 occurs automatically when a side conversation or side activity begins. In other embodiments, the delivery of the video overlay transmitted at step 303 can occur in response to user input requesting the same.

Of course, a combination of the two approaches can be used as well. A conferencing system terminal device can deliver the video overlay at step 303 not only when requested by a user, but also when specific conditions in a side conversation are detected, examples of which include a user's gaze 309 moving away from the conferencing system terminal device, a sudden change 310 in the user's audio characteristics, when the user starts speaking in a different language 311 or from a different location 312. Illustrating by example, if Kayla comes in and starts yelling at Buster as was the case in FIG. 2, the one or more processors of the conferencing system terminal device can cause the delivery of the video overlay at step 303 so that others do not have to witness the brutality.

The delivery of the video overlay at step 303 can originate locally from a conferencing system terminal device in one or more embodiments. In other embodiments, a conferencing system server complex can cause the delivery of the video overlay at step 303. Illustrating by example, as will be described below with reference to FIG. 7, in one or more embodiments a conferencing system server complex comprises a video conferencing engine 709 delivering video conferencing content to a plurality of conferencing system terminal devices during a videoconference. A side conversation/side activity monitoring engine can monitor for participants engaging in side conversations and side activities during a videoconference.

One or more processors can generate delivery of the video overlay at step 303 when one or more of the preconditions described above are met, or when requested by a side conversation participant. The one or more processors can deliver the video overlay at step 303 instead of live depictions of the side call participants to conceal their participation in the side call from others in the group.

As noted above, in one or more embodiments the video overlay transmitted at step 303 conceals the participation of an authorized user of the conferencing system terminal device in the side conversation or side activity. If the video overlay depicts the participant staring at the image capture device of a conferencing system terminal device, it will appear to the others as if the person is really paying close attention to the videoconference rather than engaging in the side conversation or side activity. The other participants will never know that the side conversation or side activity is happening. In one or more embodiments, this delivery of the video overlay at step 303 occurs without disconnecting the conferencing system terminal device from the main videoconference.

While the video overlay is being delivered during the side conversation or side activity at step 303, a number of optional steps can occur as well. Illustrating by example, step 304 can comprise reducing an output volume of the videoconference from an audio output device of the conferencing system terminal device while the side conversation or side activity is occurring. Similarly, step 304 can comprise precluding the communication device from transmitting audio signals received by an audio input device of the conferencing system terminal device to the plurality of remote electronic devices while the side conversation or side activity is occurring. In one or more embodiments, this is accomplished by muting the audio input device during the side conversation or side activity if it is not already muted when the side conversation or side activity occurs.

In one or more embodiments, step 304 can further comprise delivering, with the communication device, a notification 323 to the plurality of remote electronic devices that the authorized user is engaged in the side conversation or side activity. Where provided, the notification 323 can include a status notification to the other participants of the videoconference, examples of which include "user is in a private conversation," "user is engaged in a side activity," or "be right back," and so forth. Other examples will be obvious to those of ordinary skill in the art having the benefit of this disclosure.

In still other embodiments, step 304 can preclude the side conversation or side activity from being recorded along with recordings of the main videoconference. It should be noted that these optional steps are illustrative only, as others will be obvious to those of ordinary skill in the art having the benefit of this disclosure. Moreover, these optional steps can be used alone or in combination.

Decision 305 then determines whether the side conversation or side activity ends. As with step 302, this decision 305 can occur in a variety of ways. In one or more embodiments, when the authorized user of the conferencing system terminal device turns their gaze 316 back toward the conferencing system terminal device, one or more sensors of the conferencing system terminal device detect this to confirm that the side activity or side conversation has ceased. Similarly, a reversal of the audio characteristics 317 of the user to their normal videoconference conditions can indicate the side conversation or side activity has ceased.

If the user started speaking a different language 311 to trigger the delivery of the video overlay at step 303, returning to the original language 318 of the videoconference can signal that the side conversation or side activity has ended. A return to the original location 319 can do the same. If any detected second persons or animals leave 320 the field of view of the image capture device, this can signal the end of the side conversation or side activity. When a single voice 321 is detected, one or more sensors of the conferencing system terminal device can alert the one or more processors to the fact that the side conversation or side activity has ended. Additionally, when a user deliberately unmutes 322 their audio capture device, this can indicate that—regardless of what they are doing at the time—that they are not engaged in a side conversation or a side activity.

Where decision 305 indicates that any ongoing side conversation or side activity has ended, in one or more embodiments step 307 comprises unmuting the microphone of the conferencing system terminal device belonging to the authorized user previously engaged in the side conversation or side activity, thereby allowing the communication device of each such conferencing system terminal device to transmit audio to the plurality of remote electronic devices engaged in the main videoconference. Step 307 can also increase the output volume of the videoconference from the audio output device of the conferencing system terminal device. Where step 304 provided a status notification to the participants of the videoconference, examples of which include "user is in a private conversation," or "be right back," and so forth, when the side conversation of side activity terminates step 307 can comprise delivering an updated status notification indicating that the participation the side conversation or side activity has again turned their attention to the videoconference.

Step 308 can then comprise the one or more processors of the conferencing system terminal device causing the communication device to cease transmission of the video overlay for the authorized user of the conferencing system terminal device to the plurality of remote electronic devices in response to decision 305 determining that the side conversation or side activity has terminated. Instead, a video feed capturing depictions of the authorized user of the conferencing system terminal device can be transmitted as normal. If decision 305 indicates that the side conversation or side activity has not ceased, step 306 can occur with the video overlay and side conversation/side activity settings of the conferencing system terminal device continuing.

Figure 4:
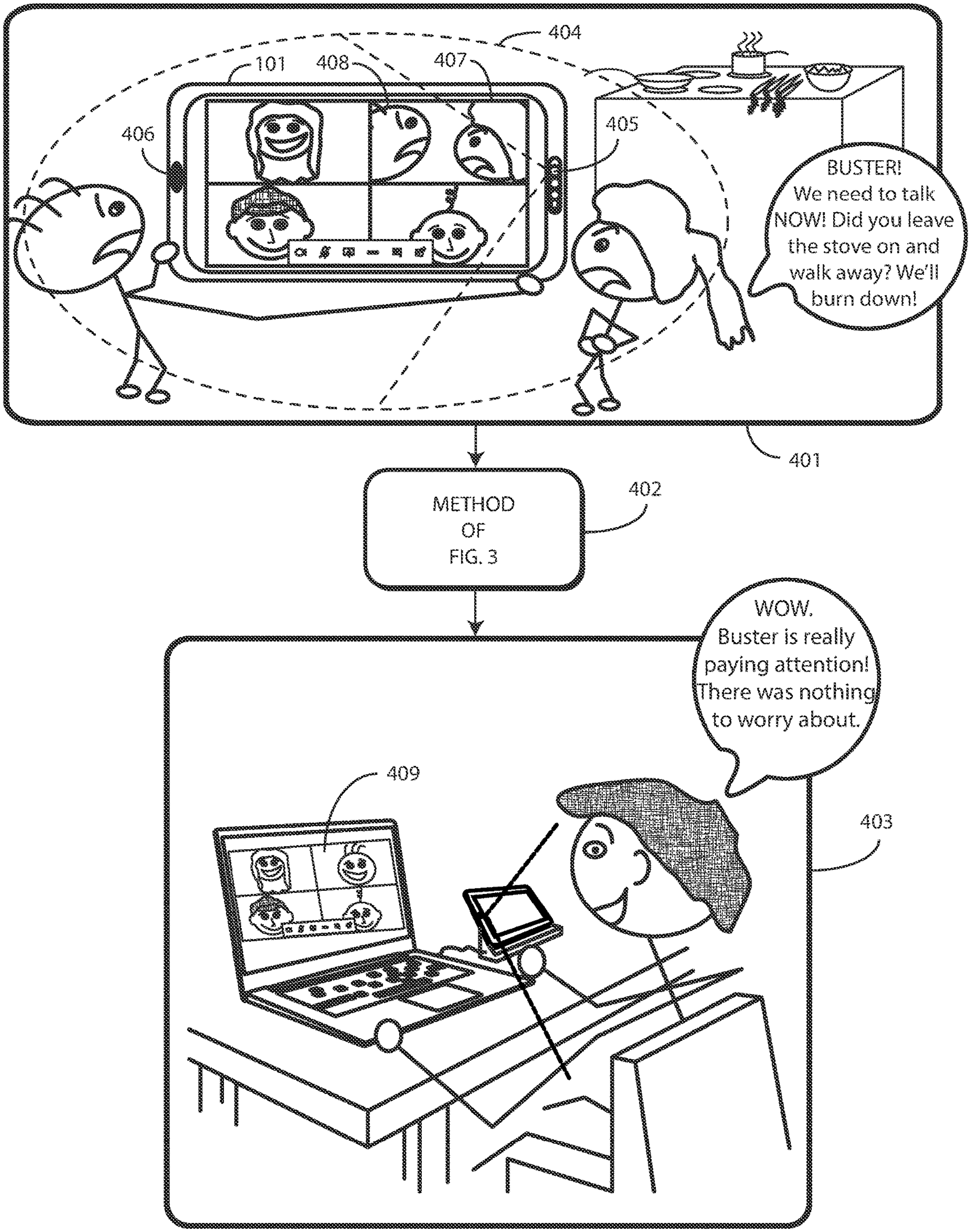
FIG. 4 illustrates one or more method steps in accordance with one or more embodiments of the disclosure.

Turning now to FIG. 4, illustrated therein is the method (300) of FIG. 3, which is executed at step 402, in action. Beginning at step 401, we revisit the situation from step (201) of FIG. 2 above. However, this time Buster is using a conferencing system terminal device 101 configured in accordance with one or more embodiments of the disclosure.

Once again, Buster's wife, Kayla, is furious because Buster inadvertently left dinner cooking on the stove. Accordingly, she lets Buster have it and have it good for once again "turning the burners on high and walking away." She starts yelling about Buster setting the house on fire, burning them all down, how irresponsible he is, how he does not listen, how dinner is now ruined, and how long it will take to start dinner again.

Fortunately, Buster's conferencing system terminal device 101 is equipped with methods and systems described herein, which are executed at step 402. In one or more embodiments, step 402 comprises detecting, with one or more sensors of the conferencing system terminal device 101 while the conferencing system terminal device is engaged in the videoconference with one or more remote electronic devices, an authorized user (here, Buster) engaging in a side conversation.

Step 401 provides numerous ways in which this can occur, examples of which include Kayla walking into the field of view 404 of the image capture device 405 of the conferencing system terminal device 101, Kayla's voice being detected by a microphone 406 carried by the conferencing system terminal device in addition to Buster's voice, the sudden change in Buster's voice has he shudders in fear while Kayla yells at him, and Buster's gaze being redirected from the conferencing system terminal device 101 and application portal 407 facilitating the videoconference toward Kayla, who is angrily standing next to him. Of course, these factors could be used alone or in combination to detect the side conversation of step 401.

At step 402, one or more processors of the conferencing system terminal device 101 conceal participation of Buster in the side conversation by replacing a video feed 408 of Buster being delivered to the one or more remote electronic devices (shown at step 401) with a video overlay 409, which is shown at step 403. As shown at step 403, the video overlay 409 depicts the authorized user but fails to depict the side conversation. In this illustrative embodiment, step 402 has also muted an audio input device (represented by microphone 406) while the side conversation is occurring.

As shown at step 403, Mac has no idea that Buster is getting completely berated by Kayla. He thinks Buster was silly for having anything to worry about and cannot believe how well Buster is paying attention. When the side conversation ends, transmission of the video overlay 409 can stop, with the video feed 408 of Buster being delivered instead as usual. To quote John Prine once again, in Mac's mind "everything is cool, everything's okay."

Thus, as shown in FIG. 4, embodiments of the disclosure automatically detect side conversations or side activities and conceal them from others when a videoconference is occurring. In one or more embodiments, a method in a conferencing system terminal device comprises detecting, with one or more processors during a videoconference, a communication device electronically in communication with a plurality of remote electronic devices engaged in the videoconference. The method also includes detecting, with one or more sensors during the videoconference, an authorized user of the conferencing system terminal device engaging in a side conversation. When this occurs, one or more processors of the conferencing system terminal device transmit a video overlay for the authorized user of the conferencing system terminal device to the plurality of remote electronic devices while the side conversation occurs.

Advantageously, by concealing the side conversation from the other participants of the videoconference, the embarrassment and humiliation that Buster feels in the situation shown in FIG. 2 can be avoided. In contrast to that embarrassment and humiliation, as shown in FIG. 4 not a single participant knows that Kayla is yelling at Buster or that he may have ruined dinner. Additionally, private or confidential information shared during the side conversation will not be shared with the other participants of the videoconference.

Figure 5:
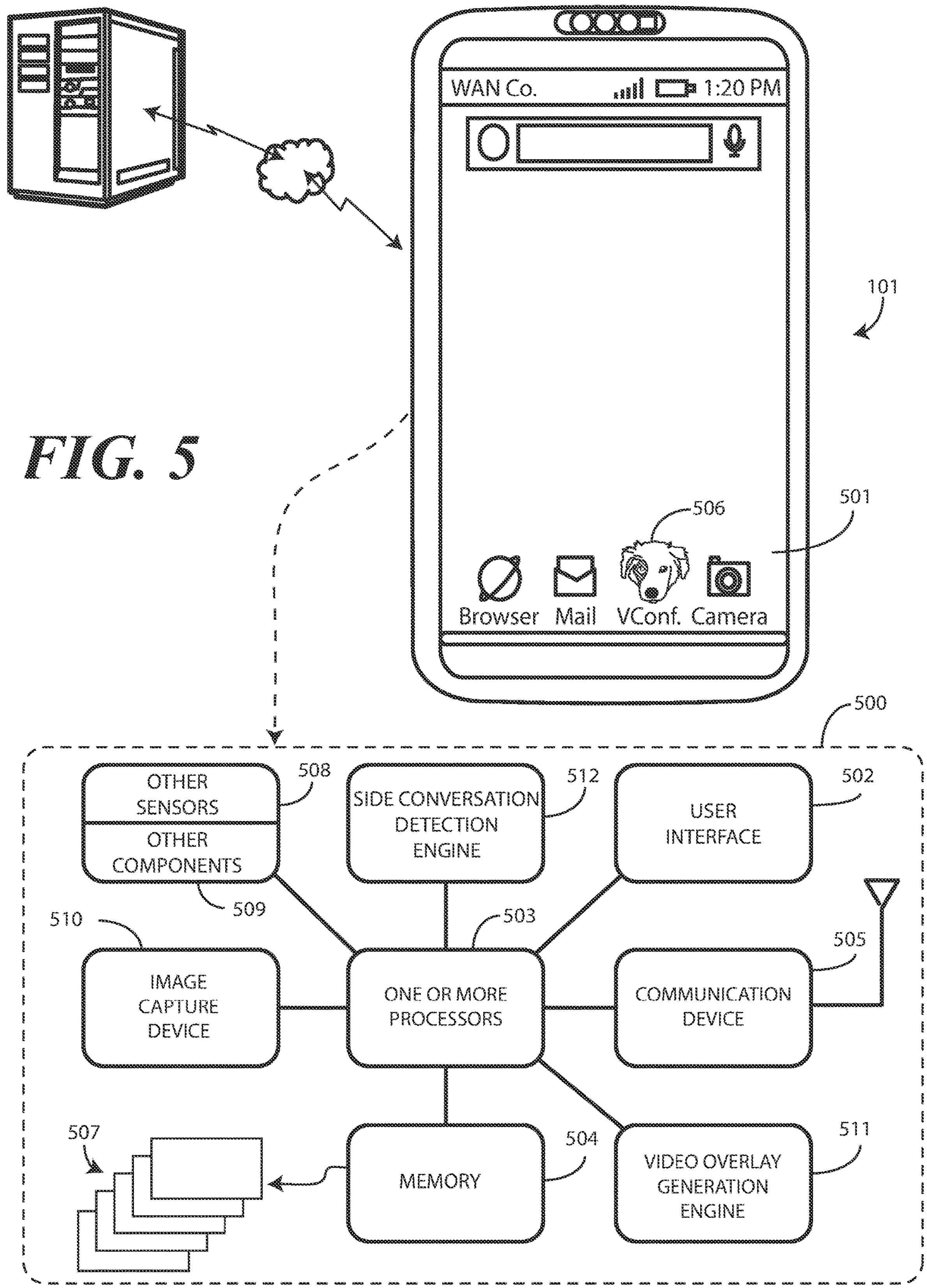
FIG. 5 illustrates one explanatory conferencing system terminal device in accordance with one or more embodiments of the disclosure.

Turning now to FIG. 5, illustrated therein is one explanatory conferencing system terminal device 101. The conferencing system terminal device 101 of FIG. 5 is a portable electronic device. For illustrative purposes, the conferencing system terminal device 101 is shown as a smartphone. However, the conferencing system terminal device 101 could be any number of other devices as well, including tablet computers, desktop computers, notebook computers, and so forth. Still other types of conferencing system terminal devices can be configured in accordance with one or more embodiments of the disclosure as will be readily appreciated by those of ordinary skill in the art having the benefit of this disclosure.

This illustrative conferencing system terminal device 101 includes a display 501, which may optionally be touch-sensitive. In one embodiment where the display 501 is touch-sensitive, the display 501 can serve as a primary user interface 502 of the conferencing system terminal device 101. Users can deliver user input to the display 501 of such an embodiment by delivering touch input from a finger, stylus, or other objects disposed proximately with the display 501.

In one embodiment, the display 501 is configured as an active-matrix organic light emitting diode (AMOLED) display. However, it should be noted that other types of displays, including liquid crystal displays, would be obvious to those of ordinary skill in the art having the benefit of this disclosure. Where the conferencing system terminal device 101 is configured with a keyboard and/or mouse, such as when the conferencing system terminal device 101 is configured as a computer, the keyboard and/or mouse can serve as the primary user interface 502.

A block diagram schematic 500 of the conferencing system terminal device 101 is also shown in FIG. 5. The block diagram schematic 500 can be configured as a printed circuit board assembly disposed within the device housing of the conferencing system terminal device 101. Various components can be electrically coupled together by conductors, or a bus disposed along one or more printed circuit boards.

In one or more embodiments, the conferencing system terminal device 101 includes one or more processors 503. In one embodiment, the one or more processors 503 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the conferencing system terminal device 101. Each of the application processor and the auxiliary processor(s) can be configured to process and execute executable software code to perform the various functions of the conferencing system terminal device 101. A storage device, such as memory 504, can optionally store the executable software code used by the one or more processors 503 during operation.

The conferencing system terminal device 101 also includes a communication device 505 that can be configured for wired or wireless communication with one or more other devices or networks. The networks can include a wide area network, a local area network, and/or personal area network. The communication device 505 may also utilize wireless technology for communication, such as, but are not limited to, peer-to-peer or ad hoc communications such as HomeRF, Bluetooth and IEEE 802.11, and other forms of wireless communication such as infrared technology. The communication device 505 can include wireless communication circuitry, one of a receiver, a transmitter, or transceiver, and one or more antennas.

In one embodiment, the one or more processors 503 can be responsible for performing the primary functions of the conferencing system terminal device 101. For example, in one embodiment the one or more processors 503 comprise one or more circuits operable with one or more user interface devices, which can include the display 501, to engage in videoconferences by transmitting, receiving, and presenting images, video, or other presentation information. The executable software code used by the one or more processors 503, including that associated with a videoconference application 506, can be configured as one or more modules 507 that are operable with the one or more processors 503. Such modules 507 can store instructions, control algorithms, logic steps, and so forth.

In one embodiment, the one or more processors 503 are responsible for running the operating system environment of the conferencing system terminal device 101. The operating system environment can include a kernel and one or more drivers, and an application service layer, and an application layer. The operating system environment can be configured as executable code operating on one or more processors or control circuits of the conferencing system terminal device 101. The application layer can be responsible for executing application service modules. The application service modules may support one or more applications or "apps," such as the videoconference application 506. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 503 may generate commands or execute control operations based upon user input received at the user interface 502. Moreover, the one or more processors 503 may process the received information alone or in combination with other data, such as the information stored in the memory 504.

The conferencing system terminal device 101 can include one or more sensors 508. The one or more sensors 508 may include a microphone, camera, any of the sensors described above, an earpiece speaker, and/or a second loudspeaker. The one or more other sensors 508 may also include touch actuator selection sensors, proximity sensors, a touch pad sensor, a touch screen sensor, a capacitive touch sensor, and one or more switches. Touch sensors may be used to indicate whether any of the user actuation targets present on the display 501, including the user actuation targets presented in a prompt facilitating the commencement of a side call as described above, are being actuated. The other sensors 508 can also include audio sensors and video sensors (such as a camera).

Figure 6:
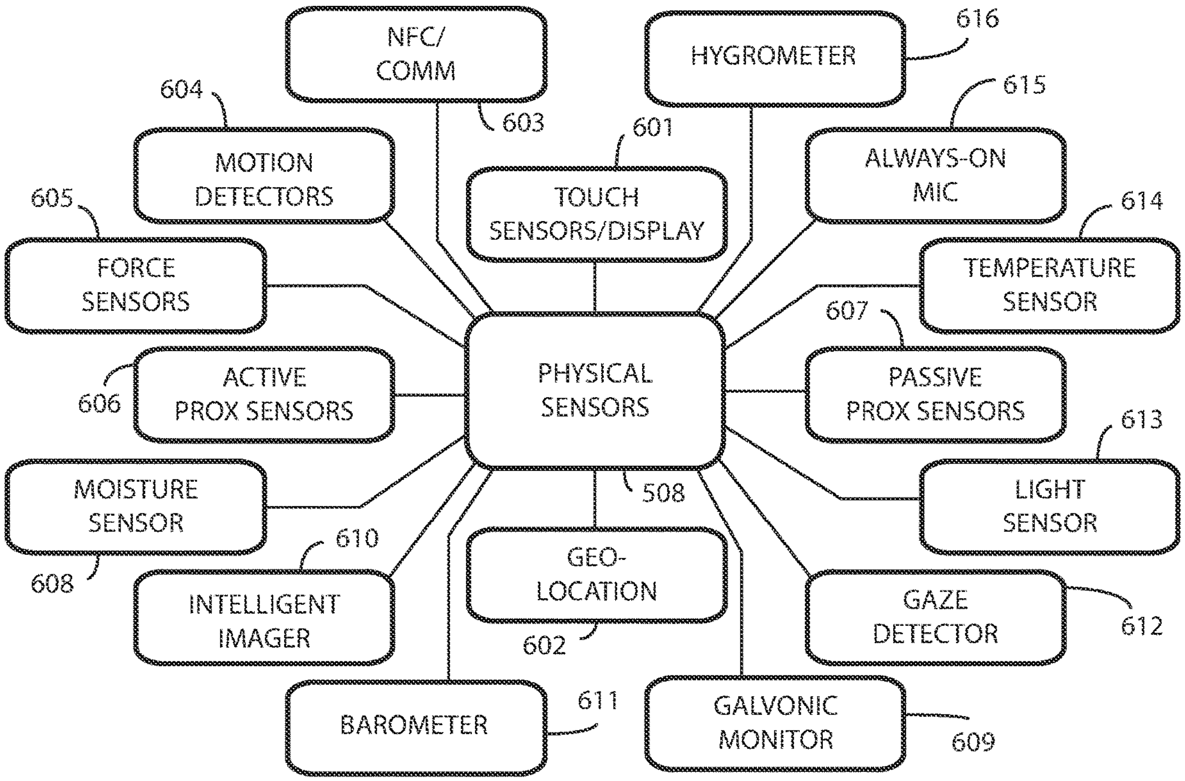
FIG. 6 illustrates one or more explanatory sensors that can be included, alone or in combination, in one explanatory conferencing system terminal device in accordance with one or more embodiments of the disclosure.

Turning briefly to FIG. 6, illustrated therein are some examples of sensors 508 that can be included with the conferencing system terminal device (101) to determine when an authorized user of the conferencing system terminal device (101) is engaged in a side conversation or side activity. Illustrating by example, the one or more sensors 508 can be used to detect a gaze of the authorized user being directed away from the conferencing system terminal device (101), detect a change in pitch of a voice of the authorized user of the conferencing system terminal device (101), detect a change in tone of a voice of the authorized user of the conferencing system terminal device (101), detect the authorized user of the conferencing system terminal device (101) switching languages or location, or detect the other conditions described above with reference to FIG. 3.

FIG. 6 illustrates several examples physical sensors 508. It should be noted that those shown in FIG. 6 are not comprehensive, as others will be obvious to those of ordinary skill in the art having the benefit of this disclosure. Additionally, it should be noted that the various physical sensors 508 shown in FIG. 6 could be used alone or in combination. Accordingly, many conferencing system terminal devices will employ only subsets of the physical sensors 508 shown in FIG. 6, with the particular subset chosen being defined by device application.

A first example of a physical sensor 508 is a touch sensor 601. The touch sensor 601 can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors (503), to detect an object in close proximity with—or touching—the surface of the display or the housing of the conferencing system terminal device by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a physical sensor 508 is a geo-locator that serves as a location detector 602. In one or more embodiments, the location detector 602 is configured to detect an authorized user of a conferencing system terminal device engaging in a side conversation by detecting the authorized user changing a location during the videoconference.

In one embodiment, location detector 602 is operable to determine location data when an image is captured from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, and other similar satellite positioning systems. The location detector 602 can make location determinations autonomously or with assistance from terrestrial base stations, for example those associated with a cellular communication network or other ground-based network, or as part of a Differential Global Positioning System (DGPS), as is well known by those having ordinary skill in the art. The location detector 602 may also be able to determine location by locating or triangulating terrestrial base stations of a traditional cellular network, or from other local area networks, such as Wi-Fi networks.

Another physical sensor 508 is a near field communication circuit 603. The near field communication circuit 603 can be included for communication with local area networks to receive information regarding the context of the environment in which a conferencing system terminal device is located. Illustrating by example, the near field communication circuit 603 may obtain information such as weather information and location information. If, for example, a user is at a museum, they may be standing near an exhibit that can be identified with near field communication. This identification can indicate that the conferencing system terminal device is both indoors and at a museum. Accordingly, if the user requests additional information about an artist or a painting, there is a higher probability that the question is a device command asking the one or more processors (503) to search for than information with a web browser. Alternatively, the near field communication circuit 603 can be used to receive contextual information from kiosks and other electronic devices. The near field communication circuit 603 can also be used to obtain image or other data from social media networks. Examples of suitable near field communication circuits include Bluetooth communication circuits, IEEE 801.11 communication circuits, infrared communication circuits, magnetic field modulation circuits, and Wi-Fi circuits.

Another example of a physical sensor 508 is the motion detector 604. Illustrating by example, an accelerometer, gyroscopes, or other device can be used as a motion detector 604 in a conferencing system terminal device. Using an accelerometer as an example, an accelerometer can be included to detect motion of the conferencing system terminal device. Additionally, the accelerometer can be used to sense some of the gestures of the user, such as one talking with their hands, running, or walking.

The motion detector 604 can also be used to determine the spatial orientation of a conferencing system terminal device as well in three-dimensional space by detecting a gravitational direction. In addition to, or instead of, an accelerometer, an electronic compass can be included to detect the spatial orientation of the conferencing system terminal device relative to the earth's magnetic field. Similarly, one or more gyroscopes can be included to detect rotational motion of the conferencing system terminal device.

Another example of a physical sensor 508 is a force sensor 605. The force sensor can take various forms. For example, in one embodiment, the force sensor comprises resistive switches or a force switch array configured to detect contact with either the display or the housing of a conferencing system terminal device. The array of resistive switches can function as a force-sensing layer, in that when contact is made with either the surface of the display or the housing of the conferencing system terminal device, changes in impedance of any of the switches may be detected. The array of switches may be any of resistance sensing switches, membrane switches, force-sensing switches such as piezoelectric switches, or other equivalent types of technology. In another embodiment, the force sensor can be capacitive. In yet another embodiment, piezoelectric sensors can be configured to sense force as well. For example, where coupled with the lens of the display, the piezoelectric sensors can be configured to detect an amount of displacement of the lens to determine force. The piezoelectric sensors can also be configured to determine force of contact against the housing of the conferencing system terminal device rather than the display.

Another example of physical sensors 508 includes proximity sensors. The proximity sensors fall in to one of two camps: active proximity sensors and "passive" proximity sensors. These are shown as proximity detector components 606 and proximity sensor components 607 in FIG. 6. Either the proximity detector components 606 or the proximity sensor components 607 can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable conferencing system terminal device worn by user, serves as the transmitter.

Illustrating by example, in one the proximity sensor components 607 comprise a signal receiver to receive signals from objects external to the housing of a conferencing system terminal device. In one embodiment, the signal receiver is an infrared signal receiver to receive an infrared emission from an object such as a human being when the human is proximately located with the conferencing system terminal device. Accordingly, the proximity sensor components 607 can be used to determine whether a side conversation is occurring in a physical environment of a conferencing system terminal device by determining when a person other than the authorized user of the conferencing system terminal device enters that physical environment.

In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components 607 have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

Proximity sensor components 607 are sometimes referred to as a "passive IR system" due to the fact that the person is the active transmitter. Accordingly, the proximity sensor component 807 requires no transmitter since objects disposed external to the housing deliver emissions that are received by the infrared receiver. As no transmitter is required, each proximity sensor component 807 can operate at a very low power level.

In one embodiment, the signal receiver of each proximity sensor component 607 can operate at various sensitivity levels so as to cause the at least one proximity sensor component 807 to be operable to receive the infrared emissions from different distances. For example, the one or more processors (503) can cause each proximity sensor component 607 to operate at a first “effective” sensitivity so as to receive infrared emissions from a first distance. Similarly, the one or more processors (503) can cause each proximity sensor component 607 to operate at a second sensitivity, which is less than the first sensitivity, so as to receive infrared emissions from a second distance, which is less than the first distance. The sensitivity change can be made by causing the one or more processors (503) to interpret readings from the proximity sensor component 607 differently.

By contrast, proximity detector components 606 include a signal emitter and a corresponding signal receiver. While each proximity detector component 606 can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components 606 comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component 606 can be an infrared proximity sensor set that uses a signal emitter that transmits a beam of infrared light that reflects from a nearby object and is received by a corresponding signal receiver. Proximity detector components 606 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

Another example of a physical sensor is a moisture detector 608. A moisture detector 608 can be configured to detect the amount of moisture on or about the display or the housing of the conferencing system terminal device. This can indicate various forms of context. Sometimes, it can indicate rain or drizzle in the environment about the conferencing system terminal device. Accordingly, if a user is frantically asking “Call a cab!” the fact that moisture is present may increase the likelihood that this ask is a device command. The moisture detector 608 can be realized in the form of an impedance sensor that measures impedance between electrodes. As moisture can be due to external conditions, e.g., rain, or user conditions, perspiration, the moisture detector 608 can function in tandem with ISFETS configured to measure pH or amounts of NaOH in the moisture or a galvanic sensor 609 to determine not only the amount of moisture, but whether the moisture is due to external factors, perspiration, or combinations thereof.

An intelligent imager 610, configured as an imager or image capture device, can be configured to capture an image of an object and determine whether the object matches predetermined criteria. For example, the intelligent imager 610 operate as an identification module configured with optical recognition such as include image recognition, character recognition, visual recognition, facial recognition, color recognition, shape recognition and the like. Advantageously, the intelligent imager 610 can be used as a facial recognition device to determine the identity of one or more persons detected within a physical environment of a conferencing system terminal device.

The intelligent imager 610 can be used to determine the commencement of a side conversation in a variety of ways. In one or more embodiments, the intelligent imager 610 detects that a gaze of an authorized user of the conferencing system terminal device is directed away from the conferencing system terminal device. In other embodiments, the intelligent imager 610 detects one or more of a second person and/or a pet entering a field of view of the intelligent imager 610 while the intelligent imager 610 is capturing images for a videoconference.

In one embodiment when the one or more proximity sensor components 607 detect a person, the intelligent imager 610 can capture a photograph of that person. The intelligent imager 610 can then compare the image to a reference file stored in memory (504), to confirm beyond a threshold authenticity probability that the person’s face sufficiently matches the reference file. Beneficially, optical recognition allows the one or more processors (503) to execute control operations only when one of the persons detected about the conferencing system terminal device are sufficiently identified as the owner of the conferencing system terminal device. This allows the intelligent imager 610 to determine whether a particular user of the conferencing system terminal device is an authorized user of the conferencing system terminal device. Moreover, when side conversations begin in some embodiments the intelligent imager 610 can determine with whom the authorized user of the conferencing system terminal device is having the side conversation.

In addition to capturing photographs, the intelligent imager 610 can function in other ways as well. For example, in some embodiments the intelligent imager 610 can capture multiple successive pictures to capture more information that can be used to determine social cues. Alternatively, the intelligent imager 610 can capture or video frames, with or without accompanying metadata such as motion vectors. This additional information captured by the intelligent imager 610 can be used to detect richer social cues that may be inferred from the captured data.

A barometer 611 can sense changes in air pressure due to environmental and/or weather changes. In one embodiment, the barometer 611 includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

A gaze detector 612 can comprise sensors for detecting the user’s gaze point. The gaze detector 612 can optionally include sensors for detecting the alignment of a user’s head in three-dimensional space. Electronic signals can then be delivered from the sensors to the gaze detection processing for computing the direction of user’s gaze in three-dimensional space. Advantageously, the gaze detector 612 can be used to detect an authorized user of a conferencing system terminal device engaging in a side conversation by detecting the gaze of the authorized user being directed away from the conferencing system terminal device.

The gaze detector 612 can further be configured to detect a gaze cone corresponding to the detected gaze direction, which is a field of view within which the user may easily see without diverting their eyes or head from the detected gaze direction. The gaze detector 612 can be configured to alternately estimate gaze direction by inputting to the gaze detection processing images representing a photograph of a selected area near or around the eyes. It will be clear to those of ordinary skill in the art having the benefit of this disclosure that these techniques are explanatory only, as other modes of detecting gaze direction can be substituted in the gaze detector 612 of FIG. 6.

A light sensor 613 can detect changes in optical intensity, color, light, or shadow in the environment of a conferencing system terminal device. This can be used to make inferences about context such as weather or other cues. For example, if the light sensor 613 detects low-light conditions in the middle of the day when the location detector 602 indicates that the conferencing system terminal device is outside, this can be due to cloudy conditions, fog, or haze. An infrared sensor can be used in conjunction with, or in place of, the light sensor 613. The infrared sensor can be configured to detect thermal emissions from an environment about a conferencing system terminal device. Where, for example, the infrared sensor detects heat on a warm day, but the light sensor detects low-light conditions, this can indicate that the conferencing system terminal device is in a room where the air conditioning is not properly set. Similarly, a temperature sensor 614 can be configured to monitor temperature about a conferencing system terminal device.

The physical sensors 508 can also include an audio capture device 615. In one embodiment, the audio capture device 615 includes one or more microphones to receive acoustic input. While the one or more microphones can be used to sense voice input, voice commands, and other audio input, in some embodiments they can be used as environmental sensors to sense environmental sounds such as rain, wind, and so forth.

In one embodiment, the one or more microphones include a single microphone. However, in other embodiments, the one or more microphones can include two or more microphones. Where multiple microphones are included, they can be used for selective beam steering to, for instance, determine from which direction a sound emanated. Illustrating by example, a first microphone can be located on a first side of the conferencing system terminal device for receiving audio input from a first direction, while a second microphone can be placed on a second side of the conferencing system terminal device for receiving audio input from a second direction. The one or more processors (503) can then select between the first microphone and the second microphone to beam steer audio reception toward the user. Alternatively, the one or more processors (503) can process and combine the signals from two or more microphones to perform beam steering.

Advantageously, the audio capture device 615 can be used to detect an authorized user of a conferencing system terminal device engaging in a side conversation. In one or more embodiments, the audio capture device 615 is configured to detect a change in pitch of a voice of the authorized user of the conferencing system terminal device. In other embodiments, the audio capture device 615 is configured to detect a change in the tone of a voice of the authorized user of the conferencing system terminal device.

In still other embodiments the audio capture device 615 is configured to detect the authorized user speaking in a different language. Accordingly, the audio capture device 615 can determine when the authorized user begins speaking in a different language during a videoconference.

In one embodiment, the audio capture device 615 comprises an "always ON" audio capture device. As such, the audio capture device 615 is able to capture audio input at any time that a conferencing system terminal device is operational. In one or more embodiments, the one or more processors, which can include a digital signal processor, can identify whether one or more device commands are present in the audio input captured by the audio capture device 615.

One further example of the physical sensors 508 is a hygrometer 616. The hygrometer 616 can be used to detect humidity, which can indicate that a user is outdoors or is perspiring. As noted above, the illustrative physical sensors of FIG. 6 are not comprehensive. Numerous others could be added. For example, a wind-speed monitor could be included to detect wind. Accordingly, the physical sensors 508 of FIG. 6 are illustrative only, as numerous others will be obvious to those of ordinary skill in the art having the benefit of this disclosure.

Turning now back to FIG. 5, other components 509 operable with the one or more processors 503 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

The other components 509 can also include an image processor. The image processor can include hardware, executable code, and image processing executable code in one embodiment. The image processor can include, stored in memory 504, basic image models, trained image models, or other modules that are used by the image processor to determine whether images captured by the imager include portions depicting obscured portions of a subject depicted in those images. In one embodiment, the image processor can include an object recognition engine. Regardless of the specific implementation utilized in the various embodiments, the image processor can access various image models to determine whether a person is engaged in an activity during a side call that may, for example, trigger the delivery of a video overlay in one or more embodiments.

To capture video during a videoconference, in one or more embodiments the conferencing system terminal device 101 includes an image capture device 510 or another imager, one example of which is the intelligent imager (610) of FIG. 6. The conferencing system terminal device 101 can optionally include a depth imager as well.

In one embodiment, the image capture device 510 comprises a two-dimensional imager configured to receive at least one image of a person within an environment of the conferencing system terminal device 101. In one embodiment, the image capture device 510 comprises a two-dimensional RGB imager. In another embodiment, the image capture device 510 comprises an infrared imager. Other types of imagers suitable for use as the image capture device 510 of the conferencing system terminal device 101 will be obvious to those of ordinary skill in the art having the benefit of this disclosure.

In one or more embodiments, the conferencing system terminal device 101 includes a side conversation detection engine 512. In one or more embodiments, the side conversation detection engine 512 is configured to detect an authorized user of the conferencing system terminal device 101 engaging in a side conversation or side activity. The side conversation detection engine 512 can use the image capture device 510, the intelligent imager (610) of FIG. 6, the gaze detector (612) of FIG. 6, or other sensors 508 to determine whether the gaze of the authorized user is directed away from the conferencing system terminal device 101, for example. The side conversation detection engine 512 can use these components to determine when one or more of a second person and/or a pet enters the physical environment of the conferencing system terminal device 101 as well.

In other embodiments, the side conversation detection engine 512 can receive signals from a audio input device (615) to determine one or more of a change in pitch of a voice of the authorized user of the conferencing system terminal device 101, a change in tone of the voice of the authorized user of the conferencing system terminal device 101, or whether the authorized user of the conferencing system terminal device 101 starts speaking another language.

In one or more embodiments, the side conversation detection engine 512 precludes the communication device 505 from transmitting audio signals from the conferencing system terminal device 101 to remote electronic devices engaged in the videoconference while a side conversation detected by the side conversation detection engine 512 is occurring. In one or more embodiments, video signal transmission can be precluded too, thereby precluding the side conversation from being recorded during the videoconference. The side conversation detection engine 512 can perform other operations described above with reference to FIGS. 3-4 as well.

In one or more embodiments, the conferencing system terminal device 101 also includes a video overlay generation engine 511 as well. In one or more embodiments, the video overlay generation engine 511 can generate the video feeds (409) as described above with reference to FIGS. 3-4.

Illustrating by example, the video overlay generation engine 511 can include a generative artificial intelligence manager that creates video overlays from real time images, in the form of animations, from training information, video libraries, image libraries, video captured during past videoconferences, or from user defined information. The video overlay generation engine 511 can employ an artificial neural network or other similar technology that detects user activities during a side call to automatically generate video overlays that, when substituted for the video signals of the side call, conceal videoconference participant engagement in the side conversation or side activity as shown above in FIG. 4.

In one or more embodiments, the side conversation detection engine 512 can cause an audio output device included with the other components 509 to reduce the volume of a videoconference with which the conferencing system terminal device 101 is engaged while a side conversation or side activity is occurring. The side conversation detection engine 512 can also cause the video overlay generation engine 511 to cease generating the video overlay when the side conversation detection engine 512 detects the side conversation terminating, thereby causing the communication device 505 to cease transmission of the video overlay.

In one or more embodiments, the side conversation detection engine 512 and/or the video overlay generation engine 511 can be operable with the one or more processors 503. In some embodiments, the one or more processors 503 can control the side conversation detection engine 512 and/or the video overlay generation engine 511. In other embodiments, the side conversation detection engine 512 and/or the video overlay generation engine 511 can operate independently from the one or more sensors 508. The side conversation detection engine 512 and/or the video overlay generation engine 511 can receive data from the various sensors 508. In one or more embodiments, the one or more processors 503 are configured to perform the operations of the side conversation detection engine 512 and/or the video overlay generation engine 511.

In one or more embodiments, the video overlay generation engine 511 automatically applies video overlays in a video feed of a videoconference. In one or more embodiments, the video overlay generation engine 511 automatically applies the video overlays in place of images depicting the authorized user of the conferencing system terminal device 101 when a side conversation or side activity is occurring. In one or more embodiments, the video overlay generation engine 511 automatically inserts the video overlays prior to the communication device 505 transmitting the images to other conferencing system terminal devices participating in the videoconference. Thereafter, the communication device 505 can transmit the video overlays to conceal participation in the side conversation or side activity. In other embodiments, the video overlay generation engine 511 inserts the video overlays into images received from other conferencing system terminal devices participating in the videoconference.

The side conversation detection engine 512 and/or the video overlay generation engine 511 can be operable with the various sensors 508 to detect, infer, capture, and otherwise determine engagement in a side conversation or side activity, examples of which include hysterical laughter, excessive crying, cursing, leaving the field of view of the image capture device 510, and so forth within an environment about the conferencing system terminal device 101 during a side conversation or side activity. For example, where included one embodiment of the side conversation detection engine 512 determines assessed contexts and frameworks using adjustable algorithms of context assessment employing information, data, and events. These assessments may be learned through repetitive data analysis. These assessments can be used to obtain additional contextual information when the contextual information changes in one or more embodiments. The side conversation detection engine 512 can comprise an artificial neural network or other similar technology in one or more embodiments.

It is to be understood that FIG. 5 is provided for illustrative purposes only and for illustrating components of one conferencing system terminal device 101 in accordance with embodiments of the disclosure and is not intended to be a complete schematic diagram of the various components required for a conferencing system terminal device. Therefore, other conferencing system terminal devices in accordance with embodiments of the disclosure may include various other components not shown in FIG. 5 or may include a combination of two or more components or a division of a particular component into two or more separate components, and still be within the scope of the present disclosure.

Figure 7:
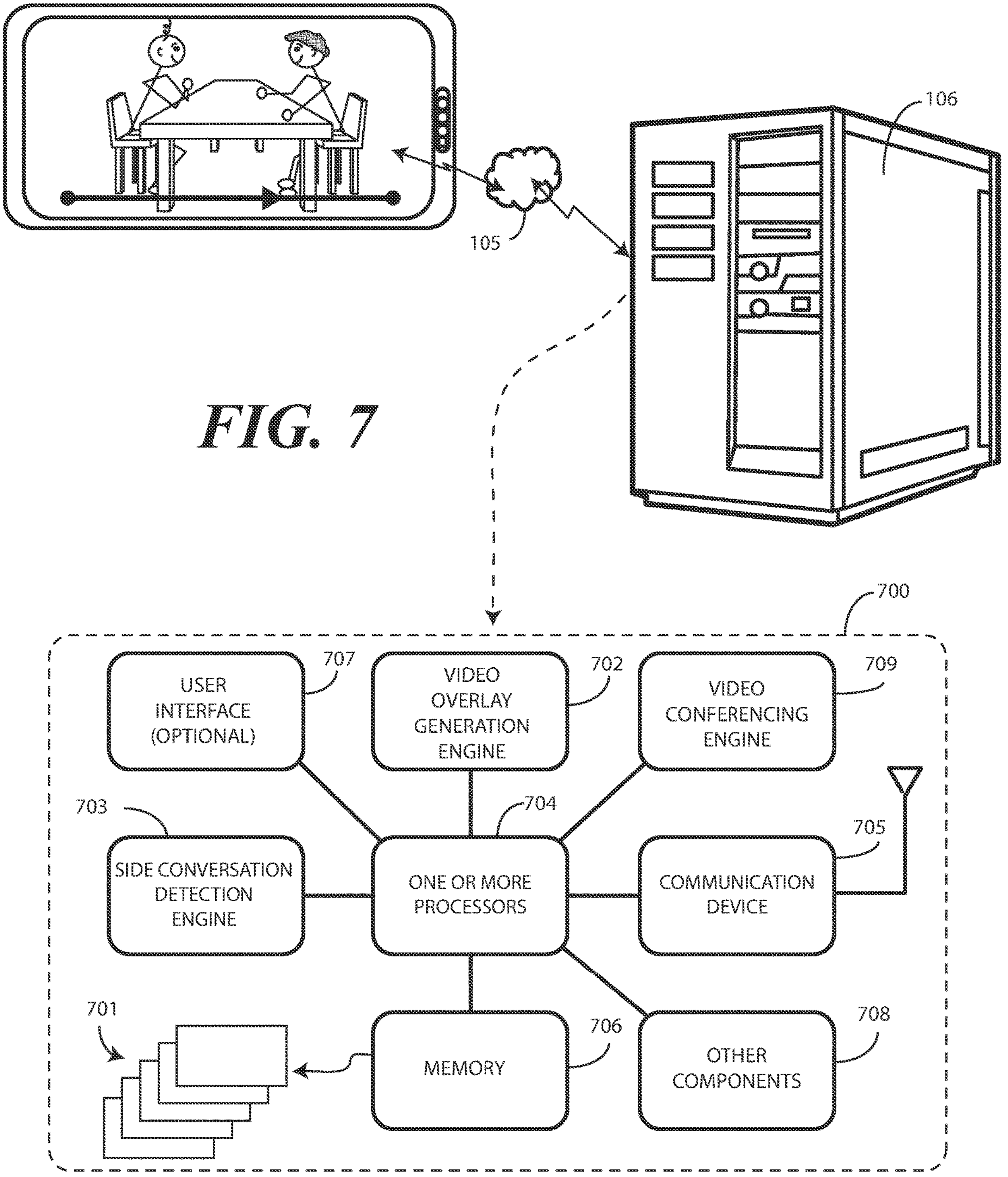
FIG. 7 illustrates one explanatory conferencing system server complex in accordance with one or more embodiments of the disclosure.

Turning now to FIG. 7, illustrated therein is one explanatory video conferencing system server complex 106 configured in accordance with one or more embodiments of the disclosure. An illustrative schematic block diagram 700 is also shown in FIG. 7.

As with the block diagram schematic (500) of FIG. 5, it is to be understood that the schematic block diagram 700 of FIG. 7 is provided for illustrative purposes only and for illustrating components of one explanatory conferencing system server complex 106 configured in accordance with one or more embodiments of the disclosure. Accordingly, the components shown in either FIG. 5 or FIG. 7 are not intended to be complete schematic diagrams of the various components required for a particular device, as other devices configured in accordance with embodiments of the disclosure may include various other components not shown in FIG. 5 or FIG. 7. Alternatively, other server complexes or conferencing system terminal devices configured in accordance with embodiments of the disclosure or may include a combination of two or more components or a division of a particular component into two or more separate components, and still be within the scope of the present disclosure.

In one or more embodiments the conferencing system server complex 106 can be configured with performing processor-intensive methods, operations, steps, functions, or procedures associated with the delivery of dynamic, automatic, and real time video overlays for an authorized user engaged in a side conversation or side activity during a videoconference. Illustrating by example, the conferencing system server complex 106 can be configured to receive one or more images 1101 in a video feed of a videoconference across a network 105.

A side conversation detection engine 703 can then be configured to determine, in response to signals from one or more sensors (508) of a conferencing system terminal device (101) determine that an authorized user of the conferencing system terminal device (101) is engaged in a side conversation or side activity. A video overlay generation engine 702 can even transmit a video overlay for an authorized user of a conferencing system terminal device engaged in a side conversation or side activity during the videoconference hosted by the videoconferencing engine 1109 to conceal participation of the authorized user in the side call as previously described.

In one or more embodiments, the conferencing system server complex 106 includes one or more memory devices 706, and one or more user interface devices 707, e.g., a display, a keyboard, a mouse, audio input devices, audio output devices, and alternate visual output devices. The conferencing system server complex 106 also includes a communication device 705. These components can be operatively coupled together such that, for example, the one or more processors 704 are operable with the one or more memory devices 706, the one or more user interface devices 707, the communication device 705, and/or other components 708 of the conferencing system server complex 106 in one or more embodiments.

The one or more processors 704 can include a microprocessor, a group of processing components, one or more ASICs, programmable logic, or other type of processing device. The one or more processors 704 can be configured to process and execute executable software code to perform the various functions of the conferencing system server complex 106.

The one or more memory devices 706 can optionally store the executable software code used by the one or more processors 704 in carrying out the operations of the videoconference system. The one or more memory devices 706 may include either or both of static and dynamic memory components. The one or more memory devices 706 can store both embedded software code and user data.

In one or more embodiments, the one or more processors 704 can define one or more process engines. For instance, the software code stored within the one or more memory devices 706 can embody program instructions and methods to operate the various functions of the conferencing system server complex 106, and also to execute software or firmware applications and modules 701 such as the side conversation detection engine 703 and/or the video overlay generation engine 702.

Figure 8:
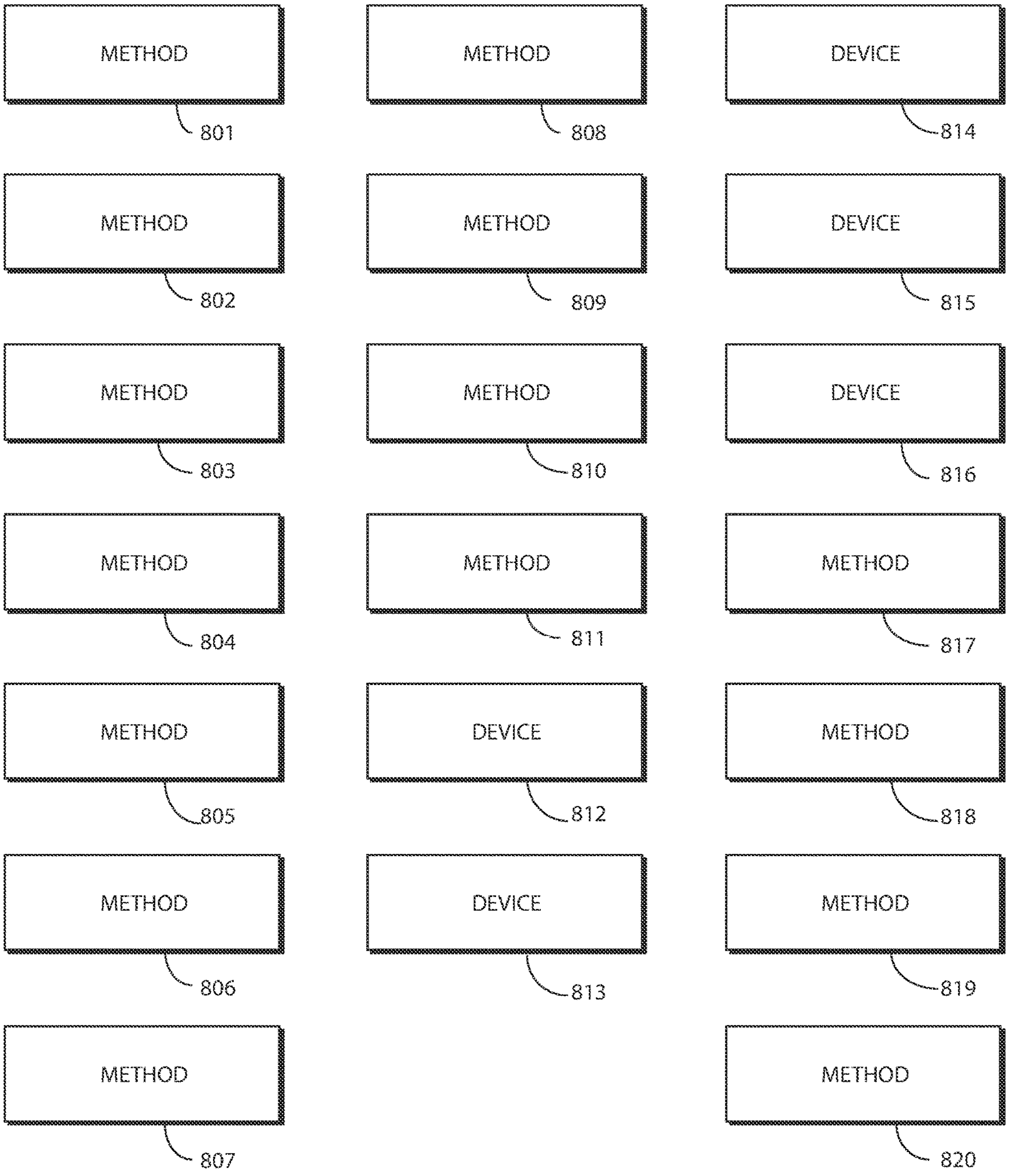
FIG. 8 illustrates one or more embodiments of the disclosure.

Turning now to FIG. 8, illustrated therein are various embodiments of the disclosure. The embodiments of FIG. 8 are shown as labeled boxes in FIG. 8 due to the fact that the individual components of these embodiments have been illustrated in detail in FIGS. 1-7, which precede FIG. 8. Accordingly, since these items have previously been illustrated and described, their repeated illustration is no longer essential for a proper understanding of these embodiments. Thus, the embodiments are shown as labeled boxes.

At 801, a method in a conferencing system terminal device comprises detecting, with one or more processors during a videoconference, a communication device electronically in communication with a plurality of remote electronic devices engaged in the videoconference. At 801, the method comprises also detecting, with one or more sensors during the videoconference, an authorized user of the conferencing system terminal device engaging in a side conversation. At 801, the method comprises causing, with the one or more processors, the communication device to transmit a video overlay for the authorized user of the conferencing system terminal device to the plurality of remote electronic devices while the side conversation occurs.

At 802, the side conversation of 801 occurs within a physical environment of the conferencing system terminal device. At 803, the video overlay of 801 conceals participation by the authorized user in the side conversation.

At 804, the detecting the authorized user engaging in the side conversation of 801 comprises detecting a gaze of the authorized user being directed away from the conferencing system terminal device. At 805, the detecting the authorized user engaging in the side conversation of 801 comprises detecting a change in pitch of a voice of the authorized user of the conferencing system terminal device.

At 806, the detecting the authorized user engaging in the side conversation of 801 comprises detecting a change in tone of a voice of the authorized user of the conferencing system terminal device. At 807, the detecting the authorized user engaging in the side conversation of 801 comprises detecting the authorized user speaking in a different language during the videoconference.

At 808, the detecting the authorized user engaging in the side conversation of 801 comprises detecting the authorized user changing a location during the videoconference. At 809, the detecting the authorized user engaging in the side conversation of 801 comprises detecting one or more of a second person and/or a pet entering a field of view of an image capture device capturing images used in the videoconference. At 810, the detecting the authorized user engaging in the side conversation of 801 comprises detecting a voice of the authorized user and another voice with an audio input device of the conferencing system terminal device.

At 811, the method of 801 further comprises reducing an output volume of the videoconference from an audio output device of the conferencing system terminal device while the side conversation is occurring. At 811, the method comprises precluding the communication device from transmitting audio signals received by an audio input device of the conferencing system terminal device to the plurality of remote electronic devices while the side conversation is occurring.

At 812, the method of 811 further comprises delivering, with the communication device, a notification to the plurality of remote electronic devices that the authorized user is engaged in the side conversation. At 813, the method of 810 further comprises detecting, by the one or more processors, termination of the side conversation during the videoconference and causing, with the one or more processors, the communication device to cease transmission of the video overlay for the authorized user of the conferencing system terminal device to the plurality of remote electronic devices in response to the termination of the side conversation.

At 814, a conferencing system terminal device comprises a communication device in communication with one or more remote electronic devices during a videoconference. At 814, the conferencing system terminal device comprises one or more sensors and one or more processors operable with the communication device and the one or more sensors.

At 814, the one or more processors determine, from signals from the one or more sensors, that an authorized user of the conferencing system terminal device is engaged in a conversation outside the videoconference. At 814, the one or more processors cause, while the conversation outside the videoconference is occurring, the communication device to transmit a video overlay to the one or more remote electronic devices concealing participation of the authorized user in the conversation outside the videoconference.

At 815, the conferencing system terminal device of 814 further comprises an audio output device. At 815, the one or more processors cause a volume of the videoconference emanating from the audio output device to decrease while the conversation outside the videoconference is occurring.

At 816, the one or more processors of 814 preclude transmission of audio signals from the conversation outside the videoconference from the communication device to the one or more remote electronic devices while the conversation outside the videoconference is occurring. At 817, the one or more processors of 814 detect, from other signals from the one or more sensors, a cessation of the conversation occurring outside the videoconference. At 817, the one or more processors cause the communication device to cease transmission of the video overlay.

At 818, a method in a conferencing system terminal device comprises detecting, with one or more sensors while the conferencing system terminal device is engaged in a videoconference with one or more remote electronic devices, an authorized user of the conferencing system terminal device engaging in a side conversation. At 818, the method comprises concealing, by one or more processors, participation of the authorized user in the side conversation by replacing a video feed of the authorized user being delivered to the one or more remote electronic devices with a video overlay.

At 819, the video overlay of 818 depicts the authorized user but fails to depict the side conversation. At 820, the method of 819 further comprises muting, by the one or more processors, an audio input device of the conferencing system terminal device while the side conversation is occurring.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in a conferencing system terminal device, the method comprising:

detecting, with one or more processors during a videoconference, a communication device electronically in communication with a plurality of remote electronic devices engaged in the videoconference;

also detecting, with one or more sensors during the videoconference, an authorized user of the conferencing system terminal device engaging in a side conversation; and causing, with the one or more processors, the communication device to transmit a video overlay for the authorized user of the conferencing system terminal device to the plurality of remote electronic devices while the side conversation occurs; wherein the video overlay comprises computer-generated imagery of the authorized user paying attention to the videoconference rather than engaging in the side conversation.

2. The method of claim 1, wherein the video overlay comprises a loop of video depicting the authorized user engaged in the videoconference while precluding other participants engaged in the videoconference from having knowledge of the side conversation.

3. The method of claim 1, wherein the video overlay depicts the authorized user and conceals participation by the authorized user in the side conversation.

4. The method of claim 1, wherein the video overlay comprises a loop depicting the authorized user looking an image capture device of the conferencing system terminal device.

5. The method of claim 1, wherein the detecting the authorized user engaging in the side conversation comprises detecting a change in pitch of a voice of the authorized user of the conferencing system terminal device.

6. The method of claim 1, wherein the detecting the authorized user engaging in the side conversation comprises detecting a change in tone of a voice of the authorized user of the conferencing system terminal device.

7. The method of claim 1, wherein the video overlay comprises previously recorded video of the authorized user applied as compensating content to conceal the authorized user engaging in the side conversation.

8. The method of claim 1, wherein the computer-generated imagery further depicts the authorized user staring at an image capture device of the conferencing system terminal device.

9. The method of claim 1, wherein the detecting the authorized user engaging in the side conversation comprises detecting one or more of a second person and/or a pet entering a field of view of an image capture device capturing images used in the videoconference.

10. The method of claim 1, wherein the detecting the authorized user engaging in the side conversation comprises detecting a voice of the authorized user and another voice with an audio input device of the conferencing system terminal device.

11. The method of claim 1, further comprising:

reducing an output volume of the videoconference from an audio output device of the conferencing system terminal device while the side conversation is occurring; and precluding the communication device from transmitting audio signals received by an audio input device of the conferencing system terminal device to the plurality of remote electronic devices while the side conversation is occurring.

12. The method of claim 11, further comprising delivering, with the communication device, a notification to the plurality of remote electronic devices that the authorized user is engaged in the side conversation.

13. The method of claim 10, further comprising:

detecting, by the one or more processors, termination of the side conversation during the videoconference; and causing, with the one or more processors, the communication device to cease transmission of the video overlay for the authorized user of the conferencing system terminal device to the plurality of remote electronic devices in response to the termination of the side conversation.

14. A conferencing system terminal device, comprising:

a communication device in communication with one or more remote electronic devices during a videoconference;

one or more sensors; and one or more processors operable with the communication device and the one or more sensors;

the one or more processors determining, from signals from the one or more sensors, that an authorized user of the conferencing system terminal device is engaged in a conversation outside the videoconference and causing, while the conversation outside the videoconference is occurring, the communication device to transmit a video overlay to the one or more remote electronic devices concealing participation of the authorized user in the conversation outside the videoconference;

wherein the video overlay comprises imagery of the authorized user paying attention to the videoconference rather than engaging in the conversation outside the videoconference.

15. The conferencing system terminal device of claim 14, further comprising an audio output device, the one or more processors causing a volume of the videoconference emanating from the audio output device to decrease while the conversation outside the videoconference is occurring.

16. The conferencing system terminal device of claim 14, the one or more processors precluding transmission of audio signals from the conversation outside the videoconference from the communication device to the one or more remote electronic devices while the conversation outside the videoconference is occurring.

17. The conferencing system terminal device of claim 14, the one or more processors detecting, from other signals from the one or more sensors, a cessation of the conversation occurring outside the videoconference and causing the communication device to cease transmission of the video overlay.

18. A method in a conferencing system terminal device, the method comprising:

detecting, with one or more sensors while the conferencing system terminal device is engaged in a videoconference with one or more remote electronic devices, an authorized user of the conferencing system terminal device engaging in a side conversation; and concealing, by one or more processors, participation of the authorized user in the side conversation by replacing a video feed of the authorized user being delivered to the one or more remote electronic devices with a video overlay depicting the authorized user paying attention to the videoconference rather than engaging in the side conversation.

19. The method of claim 18, wherein the video overlay fails to depict the side conversation.

20. The method of claim 19, further comprising muting, by the one or more processors, an audio input device of the conferencing system terminal device while the side conversation is occurring.

* * * * *